(12) United States Patent
Courtemanche et al.

(10) Patent No.: US 10,007,668 B2
(45) Date of Patent: Jun. 26, 2018

(54) METHOD AND SYSTEM FOR TRIGGERING INGESTION OF REMOTE CONTENT BY A STREAMING SERVER USING UNIFORM RESOURCE LOCATOR FOLDER MAPPING

(75) Inventors: Marc Courtemanche, Montreal (CA); Sebastien Cote, Montreal (CA)

(73) Assignee: Vantrix Corporation, Montreal (CA)

( * ) Notice: Subject to any disclaimer, the term of this patent is extended or adjusted under 35 U.S.C. 154(b) by 1617 days.

(21) Appl. No.: 12/184,926

(22) Filed: Aug. 1, 2008

(65) Prior Publication Data

US 2010/0030908 A1 Feb. 4, 2010

(51) Int. Cl.
*H04L 29/06* (2006.01)
*G06F 17/30* (2006.01)

(52) U.S. Cl.
CPC .... *G06F 17/30053* (2013.01); *G06F 17/3002* (2013.01); *G06F 17/30887* (2013.01); *H04L 65/4084* (2013.01); *H04L 65/608* (2013.01)

(58) Field of Classification Search
CPC ........ G06Q 10/10; G06Q 50/22; G06Q 30/02; H04W 36/32; G06K 9/00147; G06F 17/30616; G06F 17/30864; G06F 17/30321; G06F 17/30613; G06F 17/30312; G06F 17/30336; G06F 17/30887; G06F 17/3089; Y10S 707/99933; H04L 65/608; H04L 67/02; H04N 2201/3249
USPC .................................. 707/10, 104; 709/224
See application file for complete search history.

(56) References Cited

U.S. PATENT DOCUMENTS

| | | | |
|---|---|---|---|
| 6,269,394 B1* | 7/2001 | Kenner et al. | 709/217 |
| 6,549,922 B1* | 4/2003 | Srivastava et al. | |
| 6,701,438 B1* | 3/2004 | Prabandham et al. | 726/11 |
| 6,728,712 B1* | 4/2004 | Kelley et al. | 707/770 |
| 6,772,208 B1* | 8/2004 | Dutta | 709/225 |
| 6,785,704 B1* | 8/2004 | McCanne | 718/105 |
| 6,947,950 B2* | 9/2005 | Murthy et al. | |
| 7,289,975 B2* | 10/2007 | Clarke et al. | |
| 7,293,012 B1* | 11/2007 | Solaro et al. | |
| 7,315,541 B1* | 1/2008 | Housel et al. | 370/392 |
| 7,349,892 B1* | 3/2008 | Virdy | G06F 17/30616 |
| 7,500,188 B1* | 3/2009 | Trapani et al. | 715/273 |
| 7,596,620 B1* | 9/2009 | Colton et al. | 709/226 |
| 7,613,680 B2* | 11/2009 | Takahashi et al. | |
| 7,644,170 B2* | 1/2010 | Clarke et al. | 709/230 |
| 7,685,302 B2* | 3/2010 | Clarke | 709/230 |

(Continued)

OTHER PUBLICATIONS

Real Time Streaming protocol (RTSP), Request for Comments (RFC) 2326, H. Schulzrinne et al., published by IEFT (Internet Engineering Task Force), Apr. 1998.

(Continued)

*Primary Examiner* — Larry Donaghue
(74) *Attorney, Agent, or Firm* — IP-MEX Inc.; Victoria Donnelly

(57) ABSTRACT

A method and system to trigger ingestion of remote content or playlists by a streaming server using URL folder mapping is disclosed. The streaming server maintains a URL Map having entries that map a URL folder referenced in the streaming URL to a content server folder located on the content server. This folder level mapping enables maintaining a many-to-many relationship between multiple content identified at the streaming server and their corresponding content located at the content server.

16 Claims, 5 Drawing Sheets

(56) References Cited

U.S. PATENT DOCUMENTS

| | | | | |
|---|---|---|---|---|
| 7,933,870 | B1* | 4/2011 | Webster | G06F 17/30174 |
| | | | | 707/638 |
| 8,150,923 | B2* | 4/2012 | Vaschillo | H04L 51/36 |
| | | | | 709/206 |
| 8,365,271 | B2* | 1/2013 | Blum et al. | 726/12 |
| 2002/0019853 | A1* | 2/2002 | Vange et al. | 709/207 |
| 2002/0083013 | A1* | 6/2002 | Rollins et al. | 705/76 |
| 2002/0099737 | A1* | 7/2002 | Porter et al. | 707/513 |
| 2002/0112096 | A1* | 8/2002 | Kaminsky et al. | 709/330 |
| 2002/0124262 | A1* | 9/2002 | Basso et al. | 725/109 |
| 2002/0191222 | A1* | 12/2002 | Miyamura | H04N 1/00209 |
| | | | | 358/402 |
| 2003/0005152 | A1* | 1/2003 | Diwan | G06F 17/30899 |
| | | | | 709/239 |
| 2003/0014528 | A1* | 1/2003 | Crutcher et al. | 709/229 |
| 2003/0065645 | A1* | 4/2003 | Itoh et al. | 707/1 |
| 2003/0101245 | A1* | 5/2003 | Srinivasan | G06F 9/44505 |
| | | | | 709/221 |
| 2003/0120593 | A1* | 6/2003 | Bansal et al. | 705/39 |
| 2004/0044775 | A1* | 3/2004 | Takano et al. | 709/227 |
| 2004/0054779 | A1* | 3/2004 | Takeshima et al. | 709/225 |
| 2004/0064501 | A1* | 4/2004 | Jan et al. | 709/203 |
| 2004/0267693 | A1* | 12/2004 | Lowe et al. | 707/1 |
| 2005/0010653 | A1* | 1/2005 | McCanne | 709/219 |
| 2005/0234864 | A1* | 10/2005 | Shapiro | 707/1 |
| 2006/0048669 | A1* | 3/2006 | Kinno et al. | 104/100 |
| 2006/0070022 | A1* | 3/2006 | Ng | G06F 17/3089 |
| | | | | 717/104 |
| 2006/0072723 | A1* | 4/2006 | Chung | 379/93.24 |
| 2006/0074920 | A1* | 4/2006 | Wefers et al. | 707/100 |
| 2006/0085788 | A1* | 4/2006 | Amir et al. | 718/100 |
| 2006/0112078 | A1* | 5/2006 | Betarbet et al. | 707/3 |
| 2006/0179123 | A1* | 8/2006 | Smith | 709/219 |
| 2006/0253457 | A1* | 11/2006 | Takahashi et al. | 707/10 |
| 2006/0259637 | A1* | 11/2006 | Yadav et al. | 709/231 |
| 2006/0282500 | A1* | 12/2006 | Kiuchi et al. | 709/203 |
| 2007/0044010 | A1* | 2/2007 | Sull | G06F 17/30796 |
| | | | | 715/202 |
| 2007/0100963 | A1* | 5/2007 | Ban et al. | 709/217 |
| 2007/0168490 | A1* | 7/2007 | Kent et al. | 709/223 |
| 2007/0174474 | A1* | 7/2007 | Zhong et al. | 709/230 |
| 2007/0198458 | A1* | 8/2007 | Pudipeddi | G06F 17/30067 |
| 2007/0204012 | A1* | 8/2007 | Kruse et al. | 709/219 |
| 2007/0220000 | A1* | 9/2007 | Walsh | 707/8 |
| 2007/0266141 | A1* | 11/2007 | Norton | H04L 29/12066 |
| | | | | 709/224 |
| 2008/0005275 | A1* | 1/2008 | Overton | H04W 4/02 |
| | | | | 709/218 |
| 2008/0082507 | A1* | 4/2008 | Tarantino et al. | 707/3 |
| 2008/0109483 | A1* | 5/2008 | Yoo et al. | 707/104.1 |
| 2008/0118227 | A1* | 5/2008 | Barton | H04N 5/76 |
| | | | | 386/332 |
| 2008/0189752 | A1* | 8/2008 | Moradi et al. | 725/105 |
| 2008/0208841 | A1* | 8/2008 | Zeng et al. | 707/5 |
| 2008/0250035 | A1* | 10/2008 | Smith et al. | 707/100 |
| 2008/0273455 | A1* | 11/2008 | Green et al. | 370/218 |
| 2008/0294963 | A1* | 11/2008 | Maghfourian et al. | 707/104.1 |
| 2009/0006410 | A1* | 1/2009 | Choi | 707/9 |
| 2009/0019073 | A1* | 1/2009 | Itoh et al. | 707/101 |
| 2009/0063975 | A1* | 3/2009 | Bull et al. | 715/716 |
| 2009/0089192 | A1* | 4/2009 | Ferlitsch | G06Q 30/02 |
| | | | | 705/33 |
| 2009/0094376 | A1* | 4/2009 | Kosiba | 709/231 |
| 2009/0100268 | A1* | 4/2009 | Garcia et al. | 713/184 |
| 2009/0100505 | A1* | 4/2009 | Shaty | 726/3 |
| 2009/0125605 | A1* | 5/2009 | Chung | 709/217 |
| 2009/0125809 | A1* | 5/2009 | Trapani et al. | 715/273 |
| 2009/0128502 | A1* | 5/2009 | Li et al. | 345/173 |
| 2009/0282162 | A1* | 11/2009 | Mehrotra et al. | 709/233 |
| 2009/0307757 | A1* | 12/2009 | Groten | 726/4 |
| 2009/0327729 | A1* | 12/2009 | Rhodes | G06F 21/6218 |
| | | | | 713/171 |
| 2010/0017819 | A1* | 1/2010 | Gerbrandt et al. | 725/34 |
| 2010/0030908 | A1* | 2/2010 | Courtemanche et al. | 709/231 |

OTHER PUBLICATIONS

Real Time Streaming Protocol, Wikipedia published on-line at "http://en.wikipedia.org/wiki/Real_Time_Streaming_Protocol" prior to May 1, 2008.

"Mapping URLs to Filesystem Locations", Jun. 14, 2006, pp. 1-2, XP55035604, Retrieved from the Internet URL: http://web.archive.org/web/20060614203703/http://httpd.apache.org/docs/2.2/urlmapping.html [retrieved on Aug. 16, 2012].

"HowTo stream mp3,ogg,mp4 files with Apache2 (libapache2-mod-musicindex)", May 5, 2007, pp. 1-6, XP55035635, Retrieved from the Internet: URL:http://web.archive.org/web/20070505054959/http://ubuntuforums.org/showtread.php?t=34359 [retrieved on Aug. 16, 2012].

"Windows Media Services 2008 for Windows Server 2008" Mar. 25, 2008, pp. 1-2, XP55035644, Retrieved from the Internet: URL:http://www.bek.me/index.php?document_srl=266309&mid=hpsserver [retrieved on Aug. 16, 2012].

Proxy Caching for Media Streaming Over the Internet, Jiangchuan Liu, IEEE Communications Magazine, Aug. 2004, pp. 88 to 94.

* cited by examiner

METHOD AND SYSTEM FOR TRIGGERING INGESTION OF REMOTE CONTENT BY A STREAMING SERVER USING UNIFORM RESOURCE LOCATOR FOLDER MAPPING

FIELD OF INVENTION

The present patent application relates to content streaming, and in particular, to a method and system to trigger ingestion of remote content or playlists by a streaming server using URL folder mapping.

BACKGROUND OF THE INVENTION

Streaming servers generally pre-download content for locally storing them or define "publishing points" that map a specific streaming Uniform Resource Locator (URL) to a specific piece of content in a remote server. These mappings are configured on a one-to-one basis, with each streaming URL referenced at the streaming server requiring a publishing point to index the corresponding piece of content in the content server, e.g. one can map "rtsp://streamingserver/streams/content1" to the following content in the content server: "http://playlistserver/lists/content1".

If one wishes to map a different piece of content, it is required then to define another one-to-one mapping, e.g. to map this streaming URL "rtsp://streamingserver/streams/content2" to the following URL: "http://playlistserver/lists/content2".

This static configuration of publishing points prevents content from being dynamically added and immediately accessible through the streaming server. Furthermore, any new content addition has to be pre-downloaded or integrated as part of the publishing points at the streaming server.

Accordingly, there is a need in the industry for a method and system for dynamically ingesting remote content by a streaming server.

SUMMARY OF THE INVENTION

There is an object of the invention to provide a flexible mapping of remote content in which URL folders on a streaming server are mapped to content folders on a content server.

In a first aspect of the present invention, a method for mapping a Uniform Resource Locator (URL) folder to content folders located in a content server is disclosed. The method comprises:
  receiving a request for content at a streaming server the request including a streaming URL comprising a folder portion and a path portion;
  parsing the request to extract the streaming URL;
  analyzing the streaming URL to identify the folder portion;
  querying a configuration file to verify whether a mapping between the folder portion and a content folder is present in the configuration file, the content folder having an identifier; and
  constructing an HyperText Transfer Protocol (HTTP) content URL by concatenating the content folder identifier and the path portion to form the HTTP content URL.
The method further comprises:
sending an HTTP request to the content server using the HTTP content URL;
receiving the requested content; and
streaming the received content to a streaming client.

Furthermore, the received content of the above method is a media file or a playlist of a plurality of media files.

Beneficially, the playlist is further processed to identify individual Uniform Resource Identifier (URI) of each of the plurality of media files.

Conveniently the request for content is based on a protocol selected from the group consisting of: Real-Time Streaming Protocol (RTSP) and Microsoft Media Services (MMS).

In another aspect of the present invention, a method for dynamic ingestion of content located in a content server by a streaming server is disclosed. The method comprises:
  maintaining a Uniform Resource Locator (URL) Map at the streaming server;
  adding a new content in a content folder at the content server; and
  downloading the new content by the streaming server upon receiving a request for content from a streaming client having a new streaming URL identifying the new content wherein the downloading is performed based on the URL Map having an entry mapping a URL folder portion of the new streaming URL to a mapping URL identifying the content folder.
The downloading step comprises:
  constructing an HTTP content URL from the mapping URL and a path portion of the new streaming URL to identify the new content in the content server;
  sending an HTTP request for content to the content server using the HTTP content URL; and
  receiving the new content from the content server.

Beneficially, the method further comprises streaming the new content to the streaming client.

Advantageously, the request for content is based on a protocol selected from the group consisting of: RealTime Streaming Protocol (RTSP) and Multimedia Messaging Service (MMS).

Conveniently, the new content is processed to determine whether the new content is a media file or a playlist of a plurality of media files.

Furthermore, the playlist is processed to identify the individual Uniform Resource Identifier (URI) of each of the plurality of media files.

The step of downloading further comprises querying the URL Map to determine whether the URL Map includes the URL folder of the new streaming URL and retrieving the Mapping URL identifying the content folder if the URL folder of the new streaming URL is included in the URL Map.

In yet another aspect of the present invention, a system having a processor and a computer readable medium having instructions stored thereon for streaming content to a streaming client device is disclosed. The system comprises:
  a controller module for receiving a request for content according to a streaming protocol the request for content including a streaming URL having a URL folder portion and a path portion;
  a configuration file for maintaining a URL Map having entries for mapping URL folders to content folders located in a content server;
  an analysis module for identifying the URL folder portion and the path portion of the streaming URL and querying the configuration file to determine whether the URL folder is included in the URL Map; and
  a matching module for retrieving a Mapping URL matching the URL folder in the URL Map.

The system further comprises:
an HTTP content URL constructor module for constructing an HTTP content URL from the mapping URL and the path portion to identify the requested content in the content server;
an HTTP download module for sending an HTTP request to the content server using the HTTP content URL and for receiving the requested content; and
a media processing module for streaming the requested content to the streaming client device.

In the embodiment of the invention, the system further comprises a file characterization module for determining whether the requested content is a media file or a playlist of a plurality of media files.

Additionally, the system further comprises a playlist processing module for processing the playlist to identify a Uniform Resource Identifier (URI) of each of the plurality of media files included in the playlist.

Advantageously, the controller module comprises means for processing requests for content based on a protocol selected from the group consisting of: Real-Time Streaming Protocol (RTSP) and Microsoft Media Services (MMS).

The processing module further comprises means for streaming the requested content according to a protocol selected from the group consisting of: Real-time Transport protocol (RTP) and Advanced Streaming Format (ASF).

A computer readable medium is also provided, comprising a computer code instructions stored thereon, which, when executed by a computer, perform the steps of the methods described above.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

Figure 1:
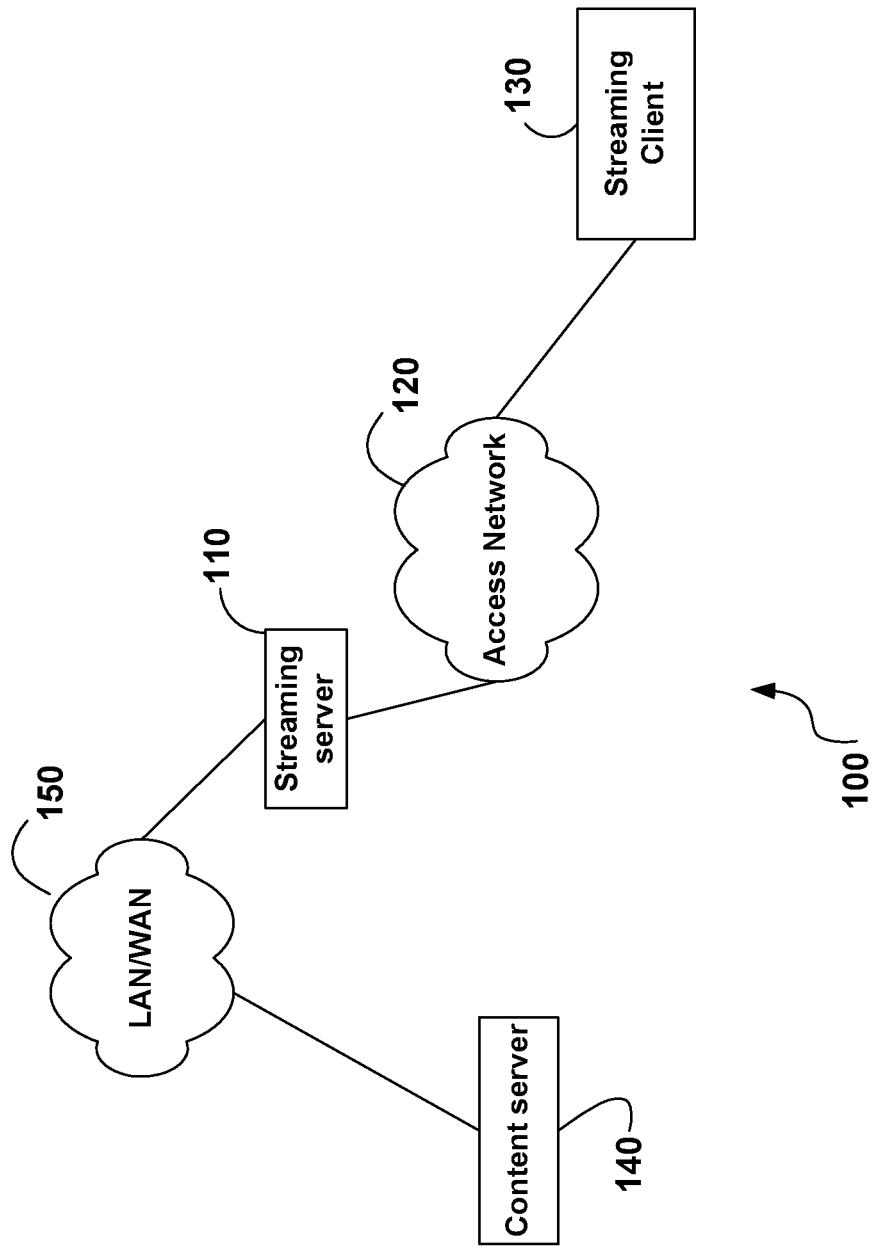
FIG. 1 illustrates a system for streaming content to a streaming client according to the embodiment of the present invention.

In describing the preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

The present invention is directed to a system and method for mapping URL folders on a streaming server to a content folder on a content server in a many-to-many fashion. FIG. 1 illustrates such a system (system 100), in which a user can request and receive a content located on the content server computer to be also referred as content server 140 from a streaming client device to be also referred as streaming client 130. Examples of streaming client 130 device include portable wireless terminals (i.e. mobile phones, PDA, etc), laptop and desktop computers. The streaming client 130 is connected through an access network 120 to the streaming server computer to be also referred as streaming server 110 which implements the mapping according to the embodiment of the present invention. The content server 140 is also connected to the streaming server 110 through a LAN/WAN network 150. In effect the content server 140 can be connected locally or remotely to the streaming server 110.

In operation, the streaming client 130 sends a request for content to the streaming server 110. The content can be audio, video or multimedia content including data, and can take the form of a single media file or a playlist of media files. The request can be based on the Real-Time Streaming Protocol (RTSP) or the Microsoft Media Services (MMS) or any other protocol for streaming media content. The request for content includes a streaming URL which identifies the streaming server 110 as well as the requested content as referenced in the streaming server 110. For example the request can be made using the RTSP DESCRIBE method: "rtsp://rtspserver/mapped/path/content RTSP/1.0 CSeq: 312 Accept: application/sdp, application/rtsp, application/mpeg".

The DESCRIBE and other RTSP methods are disclosed in the RFC 2326 entitled "Real-Time Streaming Protocol" published on the Internet Engineering Task Force (IETF) website: www.ietf.org/rfc/rfc2326.txt.

The DESCRIBE method includes the streaming URL: "rtsp://rtspserver/mapped/path/content", in which "rtsp://rtspserver" identifies the protocol RTSP and the streaming server 110 and "/mapped/path/content" identifies the requested content as referenced in the streaming server 110. The "/mapped" portion of the streaming URL identifies a URL folder portion reference in the streaming server 110 and "/path/content" portion identifies a path to the content within the content server 140.

The streaming server 110, upon processing the request according to the embodiment of the present invention, locates the content server 140 hosting the requested content to download the requested content for streaming to the streaming client 130. This operation will be described in more detail with reference to FIGS. 4 and 5.

Figure 2:
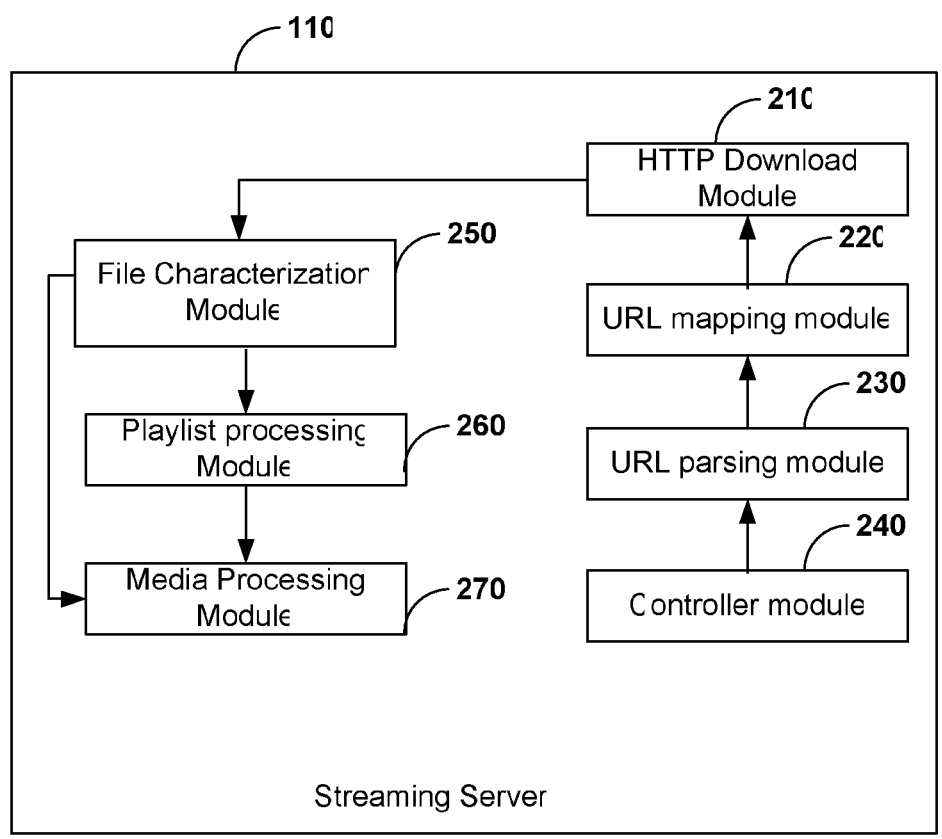
FIG. 2 illustrates a streaming server for streaming content according to the embodiment of the present invention.

FIG. 2 is a block diagram of the streaming server 110 having one or more processors and modules 210-270 stored in a computer readable storage medium of the streaming server 110 in form of computer readable instructions for execution by the processor of the streaming 110. Alternatively, modules 210-270 can be selectively implemented in dedicated hardware such as Field Programmable Gate Array (FPGA) or Application-Specific Integrated Circuit (ASIC), or other known hardware processing elements. Other implementations of these modules are also possible as known to those skilled in the art. A controller module 240 is provided to handle the setup process with the streaming client 130 and to receive the request for content from the streaming client 130. The controller module 240 communicates with the streaming client 130 according to the protocol supported by the streaming client 130 and which e.g. RTSP or MMS protocol. In one embodiment the controller module 240 includes means for processing requests for content based on RTSP or MMS implemented, e.g., a computer readable instructions stored in a computer readable storage medium. The controller module 240 communicates with a URL parsing module 230, which parses the request for content and extracts the streaming URL. A URL mapping module 220 is connected to the URL parsing module 230 and processes the streaming URL. The URL mapping module 220 determines whether a mapping exists between the URL folder portion of the streaming URL and an external content server. The URL mapping module 220 constructs a Hyper-Text Transfer Protocol (HTTP) content URL if a mapping is found according to the embodiment of the present invention. The URL mapping module will be described in more detail with reference to FIG. 3. The streaming server 110 also comprises an HTTP download module 210, which is connected to the URL mapping module 220 to receive the HTTP content URL and to initiate a content download. The streaming server 110 also includes a file characterization module 250 for determining a type of content received from the content server 140 i.e. media file or playlist. The streaming server 110 further comprises a playlist processing module 260 to process the playlist and to characterize content Uniform Resource Identifiers (URIs) within the playlist. The streaming server 110 further comprises a media processing module 270 which communicates with both the file characterization module 250 and the playlist processing module 260 to stream the content, characterized in those 2 modules, to the streaming client 130. The processing module 260 comprises means for streaming the requested content according to the Real-time Transport protocol (RTP) or the Advanced Streaming Format (ASF), which comprises instructions stored in the computer readable storage medium.

The block diagram of FIG. 2 does not show a hardware profile of the streaming server 110 or other functional modules present in the streaming server 110 to support various protocols and interfaces required for the streaming server to fully operate. For example, the hardware profile may require one or more processors, memory devices as well as magnetic and optical storage devices including volatile and non-volatile memories, Hard disks, DVD and CD-ROM. Other functional modules may include authentication, authorization and other security modules as well as functional modules related to network protocol layers (e.g. Transmission Control Protocol/User Datagram Protocol layer, Internet Protocol layer, Physical layer, etc). These functional modules are well known to those skilled in the art.

Figure 3:
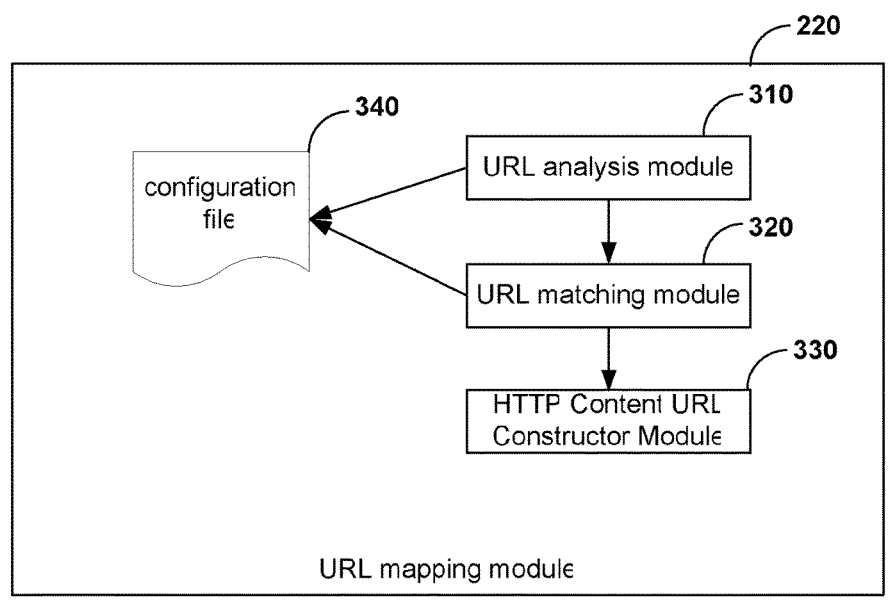
FIG. 3 illustrates a mapping module of the streaming server.

FIG. 3 shows the URL mapping module 220 in more detail. The URL mapping module 220 includes a URL analysis module 310 for analyzing the streaming URL and extracting the URL folder portion and the path portion. The URL analysis module 310 is in communication with a configuration file 340 which maintains a URL Map mapping URL folders to content folders in the content server 140. As an example, the following entry may be configured in the URL Map:
"/mapped"="http://webserver/mapping"
to map the above-mentioned URL folder "/mapped" to a "mapping URL" identifying a content server folder in the content server 140: "http://webserver/mapping". In the embodiment of the present invention, the URL analysis module 310 queries the configuration file 340 to verify whether the configured URL Map includes the URL folder.

The URL mapping module 220 also comprises a URL matching module 320 connected to the configuration file 340 to retrieve the mapping URL and to forward the mapping URL and the path portion of the streaming URL to an HTTP content URL constructor module 330. The HTTP content URL constructor module 330 constructs an HTTP content URL identifying the requested content within the content server 140 by concatenating the mapping URL with the path portion of the streaming URL, e.g. "http://webserver/mapping"+"/path/content"="http://webserver/mapping/path/content".

The URL mapping module 220, by maintaining the configuration file 340 that maps a URL folder to a content server folder, establishes a many-to-many relationship between the streaming server 110 and the content server 140 in which a plurality of content within the URL folder are mapped to a plurality of corresponding content within the content server folder with a single entry in the configuration file 340. The mapping at the folder level allows the streaming server 110 to ingest a dynamically created content at the content server 140 without any new entry or mapping in the configuration file 340. In effect, any new content created and placed within the content server folder would not need to be added in the URL Map of the configuration file 340 but would still be accessible through the folder mapping.

For example, when a new content is added in the content server folder after the URL Map is already configured at the streaming server 110, the streaming server 110 will still be able to download the new content upon receiving a request for content having a new streaming URL identifying the new content based on the URL Map. The dynamic content ingestion is actually possible due to the URL Map already including a mapping of the URL folder portion of the new streaming URL to the content server folder of the new content.

Figure 4:
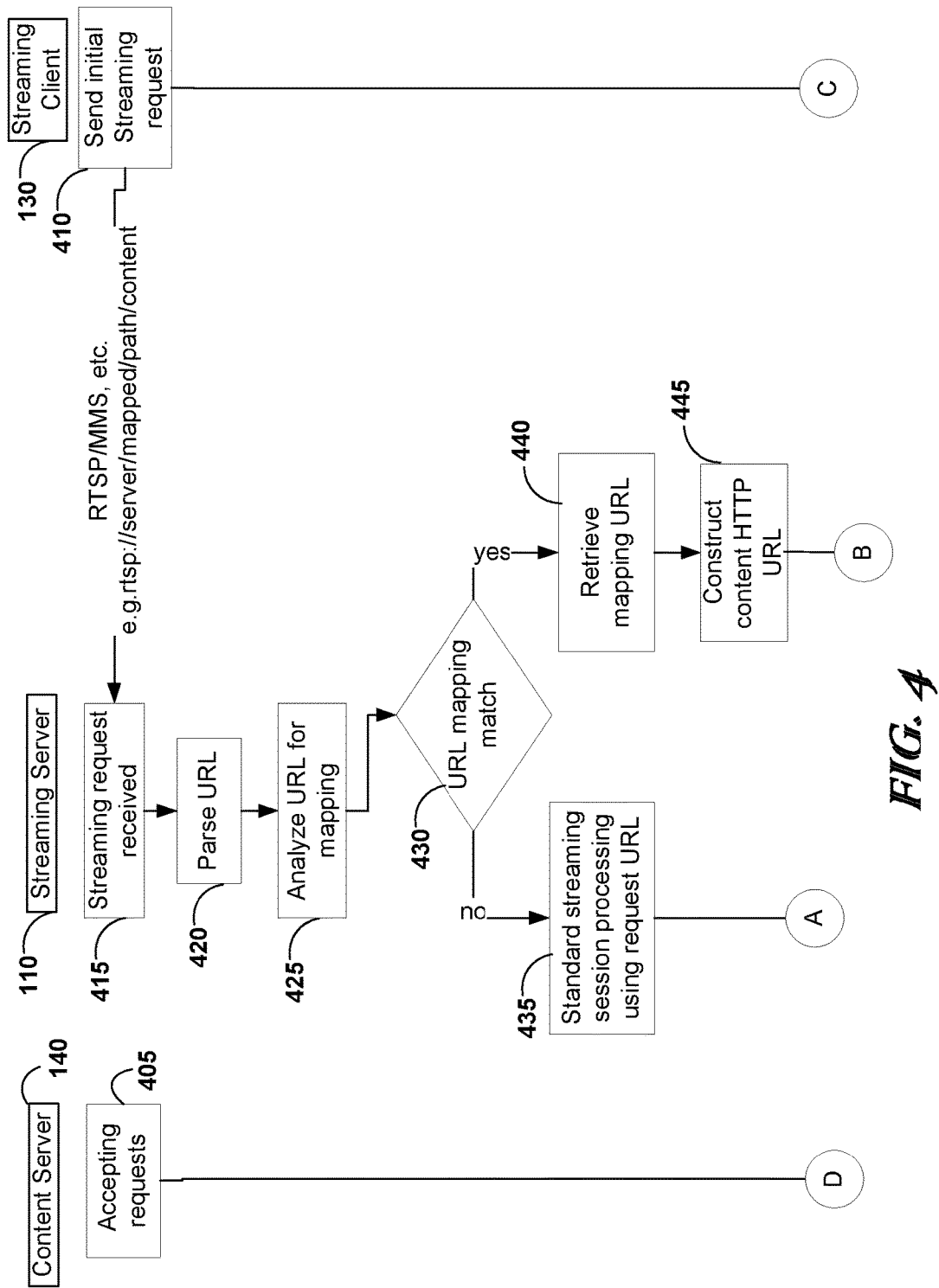
FIG. 4 shows the first part of a signal flow diagram illustrating an operation of the system of FIG. 1.
Figure 5:
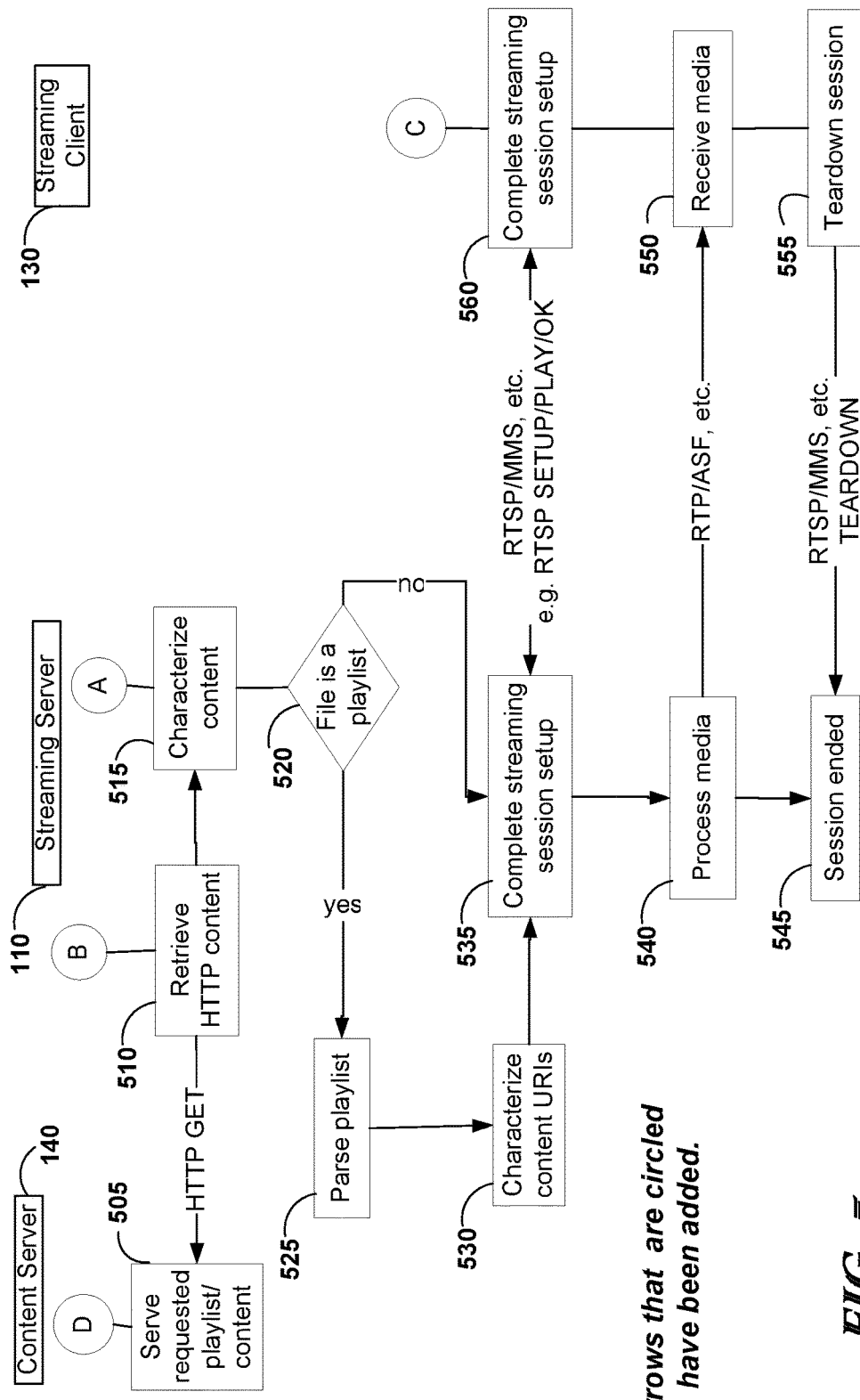
FIG. 5 shows the second part of the signal flow diagram illustrating an operation of the system of FIG. 1.

FIGS. 4 and 5, FIG. 5 being the continuity of FIG. 4, show a signal flow diagram illustrating an operation of the system 100 according to the embodiment of the present invention. At step 405 of FIG. 4, the content server 140 enters a state to accept requests for content. At step 410, a request for content is sent from the streaming client 130. Upon receiving the request at step 415, the streaming server 110 starts processing the request according to the embodiment of the present invention. The streaming URL included in the request for content is parsed at step 420 and the URL folder is extracted and analyzed at step 425. At step 430 a test is performed to look for a match of the URL folder in the URL Map of the configuration file 340. If no match is found (exit "no" of step 430), standard streaming process is performed at step 435, by retrieving a publishing point corresponding to the streaming URL and downloading content according to the URL related to the publishing point, as described above. If a match is found (exit "yes" from step 430) the mapping URL is retrieved at step 440 and, at step 445, the HTTP content URL is constructed.

FIG. 5 shows the continuity of the FIG. 4, wherein continuity points A, B, C and D correspond to the same continuity points shown in FIG. 4. At step 510, the streaming server 110 retrieves the requested content by issuing a GET HTTP content request which includes the HTTP content URL to the content server 140. At step 505, the content server 140 serves the requested content to the streaming server 110. At step 515, the streaming server 110 characterizes the received content to make a determination, at step 520, as to whether the content is of a playlist type or of a single media file type. If the content is a playlist (exit "yes" from step 520), the playlist is parsed at step 525 and, at step 530, the individual content URIs are characterized. If the requested content is not a playlist (exit "no" from step 520), the controller module 240 is invoked at step 535, to complete the streaming session setup with the streaming client 130 by sending SETUP commands identifying the content URIs received from the characterization step 530 or directly from the test step 520. The streaming client 130, in response, may send SETUP and PLAY messages back to the streaming server 110 to complete the streaming session setup in step 560 and to place the streaming client 130 in position to receive the requested content. At step 540 the media processing module 270 processes the media corresponding to the requested content for streaming to the streaming client 130. The transport mechanism to stream the media may be based on the Real-Time Transport Protocol (RTP) or the Advanced Streaming Format (ASF) or other known transport protocol for streaming media. At step 550, the streaming client 130 receives the media and may initiate at step 555 a tear down of the session once the streaming client 130 has completed the playing of the media. The session is terminated at the streaming server 110 side at step 545.

Thus an improved method and system for dynamic mapping of URL folders in a streaming server to content folders in a content server have been provided.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method of streaming a media file from an RTSP (Real Time Streaming Protocol) streaming server computer to a client device, the method comprising:
   (a) at the RTSP streaming server computer, maintaining a configuration file for mapping a folder portion of an RTSP streaming URL (Universal Resource Locator) to a HTTP content URL of a content folder on a HTTP (Hyper Text Transfer Protocol) server computer;
   (b) publishing the media file to the content folder on the HTTP server computer;
   (c) receiving, at the RTSP streaming server computer, a request for streaming the media file to the client device, the request including the RTSP streaming URL including a folder portion and a path portion;
   (d) using the configuration file to map the folder portion of the RTSP streaming URL to the URL of the content folder on the HTTP server computer;
   (e) constructing an HTTP content URL of the media file by concatenating the URL of the content folder on the HTTP server computer with the path portion of the RTSP streaming URL;
   (f) using the HTTP content URL of the media file, fetching the media file from the HTTP server computer to the RTSP streaming server computer; and
   (g) streaming the media file from the RTSP streaming server computer to the client device.

2. The method of claim 1, wherein the maintaining the configuration file for mapping the folder portion of the RTSP streaming URL to the HTTP content URL of the content folder on the HTTP server computer comprises:
   entering a predetermined folder portion of the RTSP streaming URL and a predetermined HTTP content URL of the content folder on the HTTP server computer.

3. The method of claim 1, further comprising:
   (bb) publishing a new media file to the content folder on the HTTP server computer;
   (cc) receiving, at the RTSP streaming server computer, a request for streaming the new media file to the client device, the request including a new RTSP streaming URL including the folder portion and a new path portion; and
   (dd) without adding a new entry to the configuration file, using the configuration file to map the folder portion of the new RTSP streaming URL to the URL of the content folder on the HTTP server computer.

4. The method of claim 3, further comprising:
   (ee) constructing a new HTTP content URL of the new media file by concatenating the URL of the content folder on the HTTP server computer with the path portion of the new RTSP streaming URL;
   (ff) using the new HTTP content URL of the media file, fetching the media file from the HTTP server computer to the RTSP streaming server computer; and
   (gg) streaming the new media file from the RTSP streaming server computer to the client device.

5. The method of claim 1, wherein the receiving, at the RTSP streaming server computer, the request for streaming the media file to the client device comprises:
   receiving a playlist including the RTSP streaming URL of the media file including the folder portion and the path portion.

6. The method of claim 3, wherein the receiving, at the RTSP streaming server computer (110), the request for streaming the new media file to the client device comprises:
   receiving a playlist including the RTSP streaming URL of the new media file including the folder portion and the new path portion.

7. The method of claim 1, wherein the streaming the media file from the RTSP streaming server computer to the client device comprises streaming the media file using a protocol selected from the group consisting of: Real-time Transport Protocol (RTP) and Advanced Streaming Format (ASF).

8. The method of claim 4, wherein the streaming the new media file from the RTSP streaming server computer to the client device comprises streaming the new media file using a protocol selected from the group consisting of: Real-time Transport Protocol (RTP) and Advanced Streaming Format (ASF).

9. A system having a processor and a computer readable non-transitory storage medium having instructions stored thereon for execution by the processor, for streaming a media file from an RTSP (Real Time Streaming Protocol) streaming server computer to a client device, the instructions configured to cause the processor to:
   (a) at the RTSP streaming server computer, maintain a configuration file for mapping a folder portion of an RTSP streaming URL (Universal Resource Locator) to a HTTP content URL of a content folder on a HTTP (Hyper Text Transfer Protocol) server computer;
   (b) publish the media file to the content folder on the HTTP server computer;
   (c) receive, at the RTSP streaming server computer, a request for streaming the media file to the client device, the request including the RTSP streaming URL including a folder portion and a path portion;
   (d) use the configuration file to map the folder portion of the RTSP streaming URL to the URL of the content folder on the HTTP server computer;
   (e) construct an HTTP content URL of the media file by concatenating the URL of the content folder on the HTTP server computer with the path portion of the RTSP streaming URL;
   (f) use the HTTP content URL of the media file, to fetch the media file from the HTTP server computer to the RTSP streaming server computer; and
   (g) stream the media file from the RTSP streaming server computer to the client device.

10. The system of claim 9, wherein the instructions configured to cause the processor to maintain the configuration file for mapping the folder portion of the RTSP streaming URL to the HTTP content URL of the content folder on the HTTP server are further configured to:
    enter a predetermined folder portion of the RTSP streaming URL and a predetermined HTTP content URL of the content folder on the HTTP server computer.

11. The system of claim 9, wherein the instructions are further configured to:
    (bb) publish a new media file to the content folder on the HTTP server computer;
    (cc) receive, at the RTSP streaming server computer, a request for streaming the new media file to the client device, the request including a new RTSP streaming URL including the folder portion and a new path portion; and
    (dd) without adding a new entry to the configuration file (340), use the configuration file to map the folder portion of the new RTSP streaming URL to the URL of the content folder on the HTTP server computer.

12. The system of claim 11, wherein the instructions are further configured to:
    (ee) construct a new HTTP content URL of the new media file by concatenating the URL of the content folder on the HTTP server computer with the path portion of the new RTSP streaming URL;
    (ff) use the new HTTP content URL of the media file, fetch the media file from the HTTP server computer to the RTSP streaming server computer; and
    (gg) stream the new media file from the RTSP streaming server computer to the client device.

13. The system of claim 9, wherein the instructions that cause the processor to receive, at the RTSP streaming server computer, the request for streaming the media file to the client device are further configure to:
    receive a playlist including the RTSP streaming URL of the media file including the folder portion and the path portion.

14. The system of claim 11, wherein the instructions that cause the processor to receive, at the RTSP streaming server computer, the request for streaming the new media file to the client device are further configured to:
    receive a playlist including the RTSP streaming URL of the new media file including the folder portion and the new path portion.

15. The system of claim 9, wherein the instructions that cause the processor to stream the media file from the RTSP streaming server computer to the client device are further configured to cause the processor to stream the media file using a protocol selected from the group consisting of: Real-time Transport Protocol (RTP) and Advanced Streaming Format (ASF).

16. The system of claim 12, wherein the instructions that cause the processor to stream the new media file from the RTSP streaming server computer to the client device are further configured to cause the processor stream the new media file using a protocol selected from the group consisting of: Real-time Transport Protocol (RTP) and Advanced Streaming Format (ASF).

* * * * *